Oct. 14, 1958  J. P. STEIBEL  2,856,019
THREE WHEEL VEHICLE AND SPRING SUSPENSION THEREFOR
Filed June 11, 1956  2 Sheets-Sheet 1
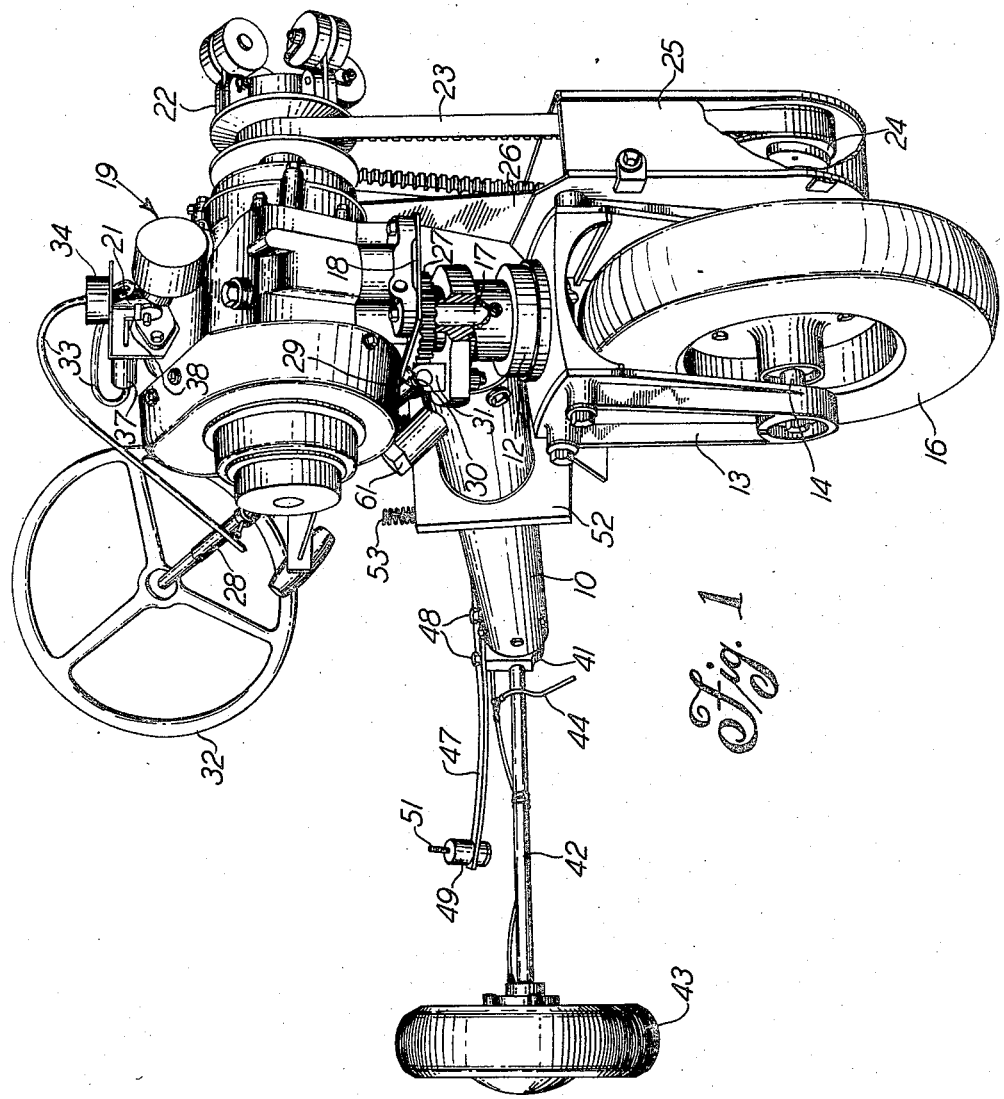
INVENTOR:
JAMES P. STEIBEL
BY: Arthur J. Hansmann
ATTORNEY Oct. 14, 1958     J. P. STEIBEL     2,856,019
THREE WHEEL VEHICLE AND SPRING SUSPENSION THEREFOR
Filed June 11, 1956     2 Sheets-Sheet 2
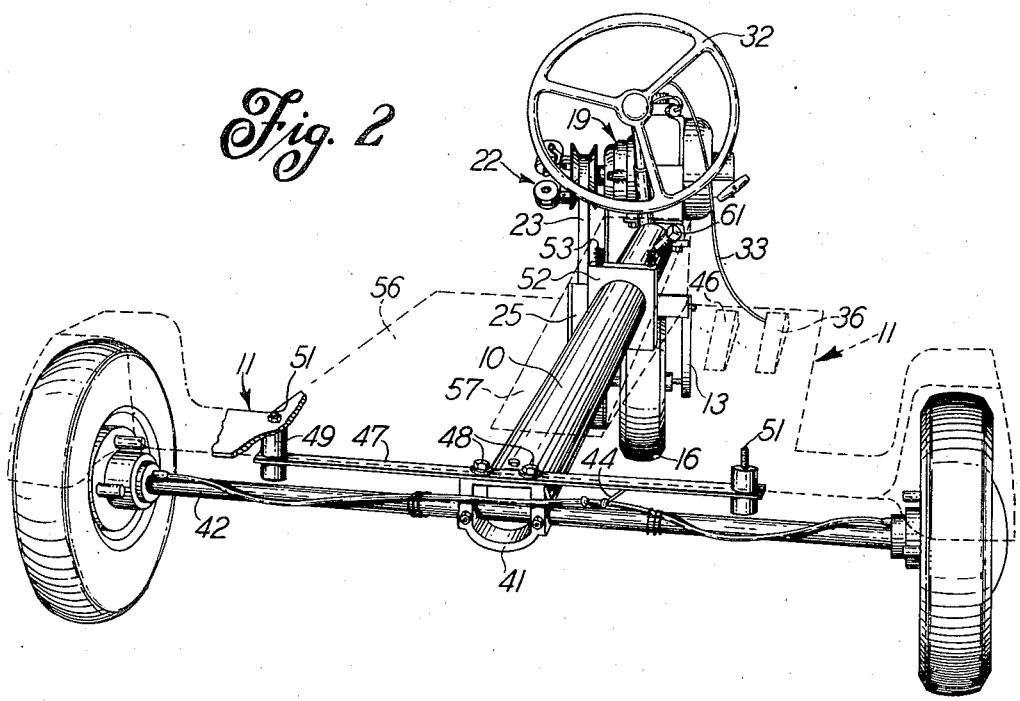
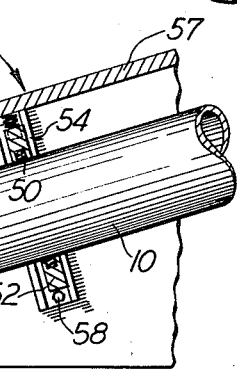
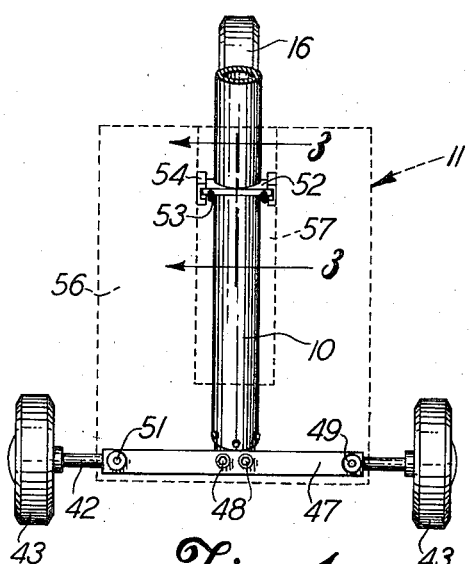
INVENTOR:
JAMES P. STEIBEL
BY: *Arthur J. Hansmann*
ATTORNEY

United States Patent Office 2,856,019
Patented Oct. 14, 1958

2,856,019

THREE WHEEL VEHICLE AND SPRING SUSPENSION THEREFOR

James P. Steibel, Racine, Wis.

Application June 11, 1956, Serial No. 590,590

8 Claims. (Cl. 180—26)

This invention relates to powered vehicles of the small type used on roads, golf courses, and the like, and, more particularly, it relates to a vehicle chassis.

It is a general object of this invention to provide a powered vehicle which is inexpensive and economical and which also incorporates features of a smooth ride and universal direction of vehicle movement although no reversing gears are employed.

A particular object of this invention is to provide a novel vehicle chassis for resiliently supporting the vehicle body and having the chassis inexpensive and compact.

Another object of this invention is to provide a novel vehicle chassis employing a rear axle of a spring material and a second spring above the axle for supporting the vehicle body.

Still another object is to provide a vehicle chassis for a tricycle vehicle with the chassis having a novel three point support arranged according to the vehicle wheel arrangement for stabilizing the vehicle against lateral tipping.

Other objects and advantages will become apparent upon reading the following description in conjunction with the accompanying drawings, wherein:

Fig. 1 is a front perspective view, with parts broken away and parts removed, of a tricycle vehicle of this invention.

Fig. 2 is a rear perspective view of the vehicle shown in Fig. 1 but with the body added in dotted lines.

Fig. 3 is an enlarged sectional view taken on the line 3—3 of Fig. 4.

Fig. 4 is a reduced diagrammatic plan view of the vehicle showing the triangular arrangement of the wheels and the body supports, with the body shown in dotted lines.

Similar reference numerals refer to similar parts throughout the several views.

Figs. 1 and 2 show a preferred embodiment of this invention of a three wheel or tricycle vehicle which is particularly designed for roads, golf courses, delivery functions, and the like, and the design specification includes economy in both manufacture and operation. The vehicle includes a frame piece or pipe beam 10 disposed in the longitudinal center plane of the vehicle. For clearly showing the vehicle, the body 11 is not shown in Fig. 1, and it is shown in dotted lines in Fig. 2. The front end of the beam 10 has a socket or bearing 12 attached thereto for support on a fork 13 which rotatably receives an axle or shaft 14 with a front wheel 16. It will be noted that a post 17 is received within the vertical hollow or opening in the bearing 12 which forms a part of the beam 10. The fork 13 and the post 17 are secured together, for steering rotation about the axis of the post, and a plate 18 is attached to the post above the bearing 12. A prime mover, shown in the form of a gasoline engine 19, is mounted on the plate 18 with a throttle 21 at the top of the engine and a centrifugal force type of pulley 22 at the side of the engine. A V-belt 23 is engaged with the pulley 22 and extends down to a second centrifugal force type of pulley 24 which is the subject matter of a co-pending patent application Serial No. 590,592 filed June 11, 1956 (now Patent No. 2,841,021). Of course, the pulley 22 is driven by the engine 19, and the lower pulley 24 is driven through the V-belt 23 to rotate the wheel 16 since the lower pulley is keyed to the axle 14. The wheel is thus driven in only one direction of rotation with regard to either end view of the axle. A housing 25 is shown enclosing the pulley 24, and a panel 26 is attached between the housing 25 and the engine 19.

The post 17 also has a ring gear 27 concentrically keyed thereto, and a steering column 28 is suitably mounted and has a universal joint 29 connecting a gear 30 on the lower end of the column for meshing with the gear 27. The gear 30 is shown rotatably supported in a bearing 31 which is fragmentarily shown. Of course, turning of the steering wheel 32 rotates the gear 30 to rotate the gear 27 and the post 17 along with its attached parts including the fork 13 and the engine 19. In this manner, the vehicle is steered and also moved in reverse since 180 degree steering of the wheel 16 to the right will cause the vehicle to go backwards and no reverse gearing is required. Of course, the post and its attached parts can rotate through approximately three-quarters of a complete circle for movement of the front wheel in a desired direction.

To permit the rotation described, a flexible connector or rubber tube 33 is attached at its one end to the throttle 21 through the top of a swivel 34, and the opposite end of the connector 33 is in the body 11. A foot control or accelerator pedal 36 is attached to the tube 33 with a conventional fluid cylinder therebetween for controlling fluid pressure in the tube 33. Thus, depressing the pedal 36 will cause the fluid pressure in the tube 33 to increase and actuate the throttle 21 through a fluid cylinder 37 and its projecting lever 38, since the tube is attached to the cylinder 37, and the cylinder lever 38 is attached to the throttle.

The opposite or rear end of the beam 10 preferably has a block 41 bolted thereto and an axle 42 of spring material, such as spring steel, is supported at its mid-point on the block 41. The axle 42 is sufficiently resilient to permit a deflection of the axle under the weight of the vehicle body and the driver when the vehicle encounters a bump in the road. Each end of the axle projects lateral of the beam and supports a rear wheel 43. Conventional type brakes are disposed within each wheel 43, and another fluid line or connector 44 is extended from the brakes to the pedal 46 on the floor of the body 11 for the usual foot control of the driver. A flat spring 47 is also attached at its mid-point to the block 41 by bolts 48 and extends lateral of the beam 10 with the spring ends disposed within the lateral extent of the wheels 43. A resilient or rubber mounting block 49 is secured to each end of the spring 47 and a bolt 51 extends above each block 49 for attaching to the floor of the body 11 at the rear end of the latter, as shown in Fig. 2.

With this arrangement of a combination of a pair of springs 42 and 47, the two springs cooperate to give a smooth ride as the spring 42 deflects upwardly at its outer ends while the spring 47 deflects downwardly at its outer ends. Also, if the bump or force on the springs were great enough, the rubber blocks 49 would be displaced into contact with the top of the spring axle 42 and the blocks 49 would still cushion the force transmitted from the wheels 43 to the body 11.

To the front end of the beam 10, there is disposed a floating and rotating vehicle support means consisting of a block 52 disposed over the beam and rotatable thereon with an O-ring 50 disposed between the block and the beam, as best seen in Fig. 3. The means also includes a pair of compression coil springs 53 disposed on the top of the block 52 for resiliently supporting the front end of the vehicle body 11 on the beam. The block 52, its mounting on the beam 10, and the springs 53 constitute a floating and resilient means mounted on the beam 10. To hold the block 52 axially of the beam 10, a channel 54 is provided on the body 11 to overlap the front and rear faces of the block 52 and thereby restrain it with respect to the body 11. It will also be noted that the body floor 56 has a longitudinal mound 57 which receives the beam 10 and the channel 54 is bolted by bolts 58 to the sides of the mound.

Thus, the body 11 can tip laterally as the spring 47 deflects and the block 52 rotates or floats on the beam 10 the amount necessary for the block to remain aligned with the tipped body 11. The two blocks 49 and the block 52 present a three point support for the body 11 with the points forming a triangle oriented with the triangular arrangement of the vehicle wheels as shown in Fig. 4. With this construction, the body 11 is supported on the points mentioned and those points are within the triangle of the wheels to make the vehicle stable against tipping since no tipping leverage can be applied to the beam as the block is close to the beam.

Another feature of this design which renders the vehicle compact is that the pipe beam 10 can be used as the gasoline tank. For this purpose, the rear end of the beam is fluid tight while the front end of the pipe contains a filling spout 61 through which the gasoline can be placed into the pipe with a forced feed taking the gasoline to the engine 19.

While a specific embodiment of this invention has been shown and described, it should be obvious that certain changes could be made therein, and the invention should, therefore, be limited only by the scope of the appended claims.

I claim:

1. In a chassis for a tricycle vehicle, the combination of a frame piece, a spring axle attached at its mid-point to one end of said frame piece and having a straight axis extending laterally of said vehicle, a wheel axially aligned with and mounted on each end of said spring axle for supporting the rear of said chassis on the ground, a flat spring attached at its mid-point to said end of said frame piece and disposed above said spring axle and extending parallel to said spring axle, means on the ends of said flat spring for attaching to a vehicle body, and a wheel attached to the other end of said frame piece for supporting the same on the ground.

2. A three wheel vehicle chassis comprising an elongated beam disposed in the longitudinal center plane of said vehicle, a post attached at the forward end of said beam and vertically disposed for supporting said beam and rotatable about its vertical axis with respect to said beam, an axle connected to the lower end of said post transverse thereto, a front wheel rotatably mounted on said axle, floating and resilient means mounted on the forward portion of said beam for floatationally and resiliently supporting the front end of a vehicle body, a first spring attached to the rear end of said beam and extending transverse to said longitudinal center plane, a rear wheel mounted on each end of said first spring, a second spring attached to the rear end of said beam and extending transverse to said longitudinal center plane and above said first spring for resiliently supporting the rear end of said vehicle body, and steering mechanism operatively attached to said post and extending to said body for steering control of said front wheel.

3. In a chassis for a three wheel vehicle, the combination of a beam, an axle of a spring material attached at its mid-point to one end of said beam and extending transverse thereto on both sides thereof, a rear wheel concentric with and mounted on each end of said axle for supporting the rear of said chassis on the ground, a spring attached at its mid-point to said end of said beam and disposed above said axle and extending on both sides of said beam, means on the ends of said spring for attaching to a vehicle body and supporting the same above said spring, a wheel attached to the other end of said beam for supporting the front end of said chassis on the ground.

4. A three wheel vehicle comprising a beam having a circular surface at one end thereof and disposed in a plane across the fore-and-aft direction of said vehicle, a member rotationally mounted on said circular surface, a first spring disposed on said member to project upward thereon, a post attached to said beam at said one end thereof and disposed in an upright position and rotatable about its upright axis and axially fixed with said beam for receiving a prime mover on the upper end of said post for rotation therewith, a front wheel mounted on the lower end of said post for rotation therewith in a wheel steering manner and for supporting said one end of said beam above the ground and for receiving a power transmission connected between said wheel and said prime mover for rotating said wheel to move said vehicle, a rear wheel axle attached to the other end of said beam for extending transverse to both sides thereof, a wheel mounted on each end of said axle, a second spring attached at the center thereof to said other end of said beam for extending transverse to both sides thereof and above said axle, a vehicle body supported on said first spring and the ends of said second spring, a steering column connected to said post and extending into said body for steering control of said front wheel.

5. A vehicle chassis comprising a frame including a frame piece disposed in the longitudinal center plane of said chassis a spring axle attached at the center thereof to the rear end of said frame piece and extending transverse thereto for deflection in response to movement of said vehicle chassis on a road, wheels mounted on the extending ends of said axle, a flat spring attached at the center thereof to said rear end of said frame piece and extending transverse thereto parallel and above said axle for attaching to a vehicle body at the transverse ends of said spring, and resilient means attached to the said flat spring and disposed above said axle to be spaced therefrom when said flat spring is not under load and for abutting said axle when said vehicle body is disposed on said flat spring and the latter is deflected.

6. A three wheel vehicle chassis comprising a beam, a member mounted on said beam to be rotatable thereon and adjacent one end thereof, a resilient means disposed on said member essentially in the vertical plane of said beam, a post attached to said beam at said one end thereof and disposed in an upright position and rotatable about its upright axis and axially fixed with said beam for supporting a prime mover on the upper end of said post for rotation therewith, a front wheel mounted on the lower end of said post for rotation therewith in a wheel steering manner and for supporting said one end of said beam above the ground whereby a power transmission can be connected between said wheel and said prime mover for rotating said wheel to move said vehicle, a rear wheel axle attached to the other end of said beam for extending transverse to both sides thereof, a wheel mounted on each end of said axle, a flat spring attached at the center thereof to said beam and disposed above said axle and laterally within the position of each said rear wheel to form a triangle with said resilient means for supporting a vehicle body on each said flat spring and said resilient means, and a steering column connected to said post and extending into said body for steering control of said front wheel.

7. A three wheel vehicle comprising a beam disposed in the longitudinal center plane of said vehicle, a first wheel attached to one end of said beam for movably supporting the latter above the ground, a pair of wheels attached to the other end of said beam with each of said pair disposed lateral of said center plane on opposite sides thereof, a flat spring directly supported on said beam at the mid-point of said spring and presenting a pair of resilient mountings in a spaced apart relation with each thereof adjacent each of said pair of wheels and being limited in downward movement of said mountings, a vehicle body disposed on said resilient mountings and attached thereto, another resilient mounting being rockably mounted on said beam for supporting said body in a free floating manner on said center plane at said one end of said beam to the extent of floating movement permitted by said pair of resilient mountings, said body and said another resilent mounting being interengaged for common rocking movement together upon vertical displacement of one of said pair of resilient mountings with respect to the other.

8. A three wheel vehicle comprising a beam disposed in the longitudinal center plane of said vehicle, a first wheel attached to one end of said beam for movably supporting the latter above the ground, a resilient supporting member rotatably mounted on said one end of said beam, an axle attached to the other end of said beam and having an end projecting on both sides of said center plane, a wheel mounted on each said end of said axle for movably supporting said beam above the ground, a flat spring attached to said other end of said beam and having an end projecting on both sides of said center plane a distance less than the projection of said axle, a vehicle body having one end disposed on said resilient supporting member, means for securing the other end of said vehicle body to each said end of said flat spring.

References Cited in the file of this patent

UNITED STATES PATENTS

| | | |
|---|---|---|
| 1,812,958 | Jennings | July 7, 1931 |
| 2,070,758 | Spatz | Feb. 16, 1937 |
| 2,421,351 | Page | May 27, 1947 |
| 2,754,146 | Feil | July 10, 1956 |

FOREIGN PATENTS

| | | |
|---|---|---|
| 494,551 | Canada | July 21, 1953 |
| 584,293 | Great Britain | Jan. 10, 1947 |
| 673,758 | Great Britain | June 11, 1952 |
| 458,547 | Italy | Aug. 10, 1950 |
| 471,751 | Italy | May 24, 1952 |